United States Patent
Biel, Jr. et al.

(10) Patent No.: US 12,285,798 B2
(45) Date of Patent: Apr. 29, 2025

(54) TOOL-LESS METHOD FOR MAKING MOLDS, CORES, AND TEMPORARY TOOLS

(71) Applicant: LightSpeed Concepts Inc., Albion, MI (US)

(72) Inventors: John P. Biel, Jr., Ann Arbor, MI (US); Brandon Michael Welker, Wixom, MI (US); John R. Keough, Ann Arbor, MI (US); Thomas Allen Cobett, Strongsville, OH (US); Julie Ruth Nimer, Walled Lake, MI (US)

(73) Assignee: LightSpeed Concepts Inc., Albion, MI (US)

( * ) Notice: Subject to any disclaimer, the term of this patent is extended or adjusted under 35 U.S.C. 154(b) by 122 days.

(21) Appl. No.: 17/333,328

(22) Filed: May 28, 2021

(65) Prior Publication Data

US 2021/0370388 A1    Dec. 2, 2021

Related U.S. Application Data

(60) Provisional application No. 63/033,064, filed on Jun. 1, 2020.

(51) Int. Cl.
*B22C 9/02* (2006.01)
*B29C 64/165* (2017.01)
(Continued)

(52) U.S. Cl.
CPC .............. *B22C 9/02* (2013.01); *B29C 64/165* (2017.08); *B33Y 10/00* (2014.12); *B33Y 80/00* (2014.12)

(58) Field of Classification Search
CPC ............ B29C 64/165; B22C 9/02; B22C 1/26
See application file for complete search history.

(56) References Cited

U.S. PATENT DOCUMENTS

| 2,999,283 A | * | 9/1961 | Barth | ....................... B22C 1/26 |
| | | | | 524/48 |
| 4,844,144 A | | 7/1989 | Murphy et al. | |

(Continued)

FOREIGN PATENT DOCUMENTS

| WO | 97/30114 A1 | 8/1997 |
| WO | 2004/076734 A1 | 9/2004 |

(Continued)

OTHER PUBLICATIONS

T.O. Joshua et al, Hybrid Effect of Selected Local Binders on the Moulding Properties of River Niger Silica Sand for Industrial Application, Journal of Nanoscience with Advanced Technology, vol. 1, Issue: 4, p. 19-23 (Year: 2016).*

(Continued)

*Primary Examiner* — Alex A Rolland
(74) *Attorney, Agent, or Firm* — Howard & Howard Attorneys PLLC

(57) ABSTRACT

A tool-less method for making molds, cores, and temporary tools includes the steps of providing a volumetric build system, making a CAD model of a three-dimensional object, selecting a build material including an untreated sand, selecting a binder comprising a polymeric carbohydrate, and applying, by the volumetric build system, the binder onto the build material to three dimensionally print the object, wherein the object is adapted for being a mold, a core, or a temporary tool.

26 Claims, 3 Drawing Sheets

(51) Int. Cl.
  *B33Y 10/00* (2015.01)
  *B33Y 80/00* (2015.01)

(56) References Cited

U.S. PATENT DOCUMENTS

| | | | | |
|---|---|---|---|---|
| 5,204,055 | A * | 4/1993 | Sachs | B33Y 40/00 |
| | | | | 264/432 |
| 5,457,142 | A * | 10/1995 | Dando | B22C 1/02 |
| | | | | 524/424 |
| 6,117,612 | A | 9/2000 | Halloran et al. | |
| 6,147,138 | A | 11/2000 | Hochsmann et al. | |
| 6,155,331 | A * | 12/2000 | Langer | B33Y 10/00 |
| | | | | 164/4.1 |
| 6,193,922 | B1 | 2/2001 | Ederer | |
| 6,286,580 | B1 * | 9/2001 | Ward | B22C 5/00 |
| | | | | 164/520 |
| 6,405,095 | B1 | 6/2002 | Jang et al. | |
| 6,423,255 | B1 | 7/2002 | Hoechsmann et al. | |
| 6,921,430 | B2 * | 7/2005 | Bloembergen | C09J 103/02 |
| | | | | 106/206.1 |
| 7,533,713 | B2 | 5/2009 | Pfeifer et al. | |
| 7,722,802 | B2 | 5/2010 | Pfeifer et al. | |
| 7,807,077 | B2 * | 10/2010 | Hochsmann | B33Y 70/10 |
| | | | | 264/219 |
| 7,955,537 | B2 | 6/2011 | Ederer et al. | |
| 8,020,604 | B2 | 9/2011 | Hochsmann | |
| 8,122,939 | B2 | 2/2012 | Hochsmann | |
| 8,506,870 | B2 | 8/2013 | Hochsmann et al. | |
| 8,741,194 | B1 | 6/2014 | Ederer et al. | |
| 9,381,564 | B2 | 7/2016 | McGuire et al. | |
| 9,403,324 | B2 | 8/2016 | Ederer et al. | |
| 9,901,977 | B2 | 2/2018 | Bohra et al. | |
| 10,144,053 | B2 | 12/2018 | Bartels et al. | |
| 10,213,938 | B2 | 2/2019 | Ederer et al. | |
| 10,343,301 | B2 | 7/2019 | Gunther et al. | |
| 10,357,819 | B2 | 7/2019 | Schilling | |
| 10,471,497 | B2 | 11/2019 | Orange et al. | |
| 10,538,030 | B2 | 1/2020 | DeSimone et al. | |
| 10,906,091 | B2 | 2/2021 | Lin et al. | |
| 10,913,207 | B2 | 2/2021 | Ederer et al. | |
| 10,946,556 | B2 | 3/2021 | Ederer et al. | |
| 10,953,571 | B2 | 3/2021 | Snyder et al. | |
| 10,960,460 | B2 | 3/2021 | Snyder et al. | |
| 2008/0060778 | A1 * | 3/2008 | Velasco-Tellez | B22C 1/185 |
| | | | | 164/20 |
| 2011/0156304 | A1 | 6/2011 | Walker et al. | |
| 2015/0273572 | A1 * | 10/2015 | Ederer | B29C 64/165 |
| | | | | 164/15 |
| 2016/0067766 | A1 | 3/2016 | Verreault et al. | |
| 2016/0193651 | A1 * | 7/2016 | Orange | B22C 9/02 |
| | | | | 164/526 |
| 2017/0050237 | A1 * | 2/2017 | Körschgen | B22C 9/123 |
| 2017/0157852 | A1 | 6/2017 | Ederer et al. | |
| 2017/0182680 | A1 | 6/2017 | England | |
| 2017/0297263 | A1 | 10/2017 | Ederer et al. | |
| 2017/0312812 | A1 | 11/2017 | Wu | |
| 2017/0320128 | A1 | 11/2017 | Deters et al. | |
| 2017/0326623 | A1 | 11/2017 | Wowezuk et al. | |
| 2018/0009128 | A1 | 1/2018 | Sokol et al. | |
| 2018/0009134 | A1 | 1/2018 | Berben et al. | |
| 2018/0099329 | A1 | 4/2018 | Korff | |
| 2018/0154555 | A1 | 6/2018 | Ames | |
| 2018/0222082 | A1 | 8/2018 | Gunther et al. | |
| 2018/0236532 | A1 | 8/2018 | Forsmark et al. | |
| 2018/0354278 | A1 * | 12/2018 | Griffin | B41J 11/007 |
| 2018/0370081 | A1 | 12/2018 | McCarthy et al. | |
| 2019/0126509 | A1 | 5/2019 | Gelbart | |
| 2019/0248054 | A1 | 8/2019 | Mike et al. | |
| 2020/0086381 | A1 | 3/2020 | Leinauer et al. | |
| 2020/0130263 | A1 | 4/2020 | Gunther et al. | |
| 2020/0206810 | A1 | 7/2020 | Lavi et al. | |
| 2020/0230694 | A1 | 7/2020 | Cobett et al. | |
| 2020/0338629 | A1 | 10/2020 | Herzog | |
| 2020/0338818 | A1 | 10/2020 | Teng | |
| 2020/0346372 | A1 | 11/2020 | McCarthy et al. | |
| 2021/0031257 | A1 | 2/2021 | Homa et al. | |
| 2021/0069774 | A1 | 3/2021 | Fernandez Orive | |
| 2021/0069775 | A1 | 3/2021 | Sekula et al. | |
| 2021/0107055 | A1 | 4/2021 | Reinold et al. | |
| 2021/0107227 | A1 | 4/2021 | Ederer et al. | |

FOREIGN PATENT DOCUMENTS

| | | |
|---|---|---|
| WO | 2020/096951 A1 | 5/2020 |
| WO | 2020/245301 A1 | 12/2020 |
| WO | 2021/015074 A1 | 1/2021 |

OTHER PUBLICATIONS

S.A Yaro et al, Cassava/Guinea Corn Starches and Soybean Oil as Core Binders in Sand Casting of Aluminium Silicon (AL-Si) LLOY, Journal of Engineering and Technology (JET) vol. 1 No. 1 (Year: 2006).*

Apeh, Friday Ichifu et al., Impact of Moisture Variation on some Foundry Properties of Fori Silica Sand, Journal of Minerals and Materials Characterization and Engineering, 2022, pp. 429-437, 10, Bauchi, Nigeria.

Sanders, Clyde A., Copper-Base Alloy Foundry Practice, American Colloid Company, pp. 280-281, Chapter XIII, Skokie, Illinois, Printed in U.S.A.

Umar, Alhaji Adamu et al., Effect of Grain Size and Clay Content on the Moulding Properties of River Niger Bank Sand for Foundry, Nov. 2019, Proceedings of National Engineering Conference, Kaduna, Nigeria.

Mshelia, Z.A. et al., Characterisation of Natural Moulding Sands from Selected Deposits in Maiduguri-Nigera for Casting Applications, Arid Zone Jornal of Engineering, Technology and Environment, Aug. 1, 2016, 3 pages.

Eunice, Ekpunobi Uche et al., XRD Characterization of Sand Deposit in River Niger (South Eastern Nigeria), American Chemical Science Journal, Jun. 1, 2013, pp. 287-293, 3(3), Sciencedomain International, Anambra state, Nigeria.

Omidiji, B.V., et al. Characterization of Southwestern Nigeria River Sand for foundry use, International Journal of Engineering Sciences, Jul. 11, 2020, pp. 36-42, 13(2), SCMR, Ile-Ife, Nigeria.

Yushau, Aminu Zakari et al., Moulding Properties of Kaduna River Bank Sand for Application in Foundry Workship, International Journal of Engineering Research & Technology (IJERT), Apr. 2024, 4 pages, vol. 13, Issue 4.

High Fructose Corn Syrup Questions and Answers, U.S. Food &Drug Administration, Oct. 1, 2024, 1 page.

Paul, Sourabh et al., Use of aqueous polyvinyl alcohol in binder jetting of Inconel 718, The International Journal of Advanced Manufacturing Technology, Oct. 17, 2024, 18 pages,, Springer.

Indra, Ade et al., The effect of PVA addition as binders on the properties of hydroxyapatite sintered body, ICITID, Aug. 330, 2021, 11 pages, Yogyakarta, Indonesia.

Liao, Junbin et al., Cost-Effective Water-Soluble Poly(vinyl alcohol) as a Functional Binder for High-Sulfur-Loading Cathodes in Lithium-Sulfur Batteries, ACS Omega, 2020, pp. 8272-8282, American Chemical Society.

Mandal, Prithwiraj et al., Influence of Binder Crystallinity on the Performance of Si Electrodes with Poly(vinyl alcohol) Binders, ACS Applied Energy Materials, 2021, pp. 3008-3016, American Chemical Society.

6.I: Structure and Function-Carbohydrates, OpenOregon Educational Resources, 17 pages.

Polymer, https://www.vedantu.com/question-answer/which-one-is-a-polymer-of-fructose-a-glycogen-b-class-11-biology-cbse-5f97116e2f43140eb8b81adc, 4 pages.

Fructose, https://en.m.wikipedia.org/wiki/fructose, 9 pages.

Sucrose, https://biologydictionary.net/?s=sucrose, 2 pages.

* cited by examiner

TOOL-LESS METHOD FOR MAKING MOLDS, CORES, AND TEMPORARY TOOLS

CROSS-REFERENCE TO RELATED APPLICATION(S)

The present application claims the benefit of and priority to U.S. Provisional Patent Application Ser. No. 63/033,064, filed Jun. 1, 2020, the entire disclosure of which is hereby expressly incorporated by reference.

BACKGROUND OF THE INVENTION

1. Field of the Invention

The present invention relates generally to methods for making molds, cores, and temporary tools and, more particularly, to a tool-less method for making molds, cores, and temporary tools.

2. Description of the Related Art

Molds such as sand molds are used to form complex metal objects that can be made of nearly any alloy. The sand-casting process involves the use of a furnace, a metal, a pattern or tooling, and a sand mold. The metal is melted in the furnace and then poured into the cavity of the sand mold, which is formed by the pattern. The sand mold separates along a parting line and the solidified casting can be removed as known in the art. Most sand molds are broken into many pieces in order to remove the casting. Thus, the molds cannot be used again without preparing the sand for re-bonding and forming a new mold.

Volumetric Build (VB) systems are currently used primarily to quickly produce objects and prototype parts from 3D computer-aided design (CAD) tools. Most VB systems use a VB process that has an additive, layer-by-layer approach to building parts by joining liquid, paste, powder, or sheet materials to form physical objects. The data referenced in order to create the layers is generated from a CAD system using thin, horizontal cross-sections of a CAD model.

VB process has been used in the past for making molds for casting metals. For example, U.S. Patent Application Publication No. 2016/0193651 discloses VB metal-casting molds and methods for making the same. In this patent application publication, methods are disclosed of making metal casting molds and components thereof by the VB process in which an untreated sand is used as the build material and a polymer is used as a component of the binder that is printed onto the build material. However, there is a need in the art for a new method for making molds, cores, and temporary tooling using a VB process to improve speed and be more environmentally friendly by eliminating or reducing Volatile Organic Compounds (VOCs), respirable silica dust in the air within the foundry, and waste in general.

SUMMARY OF THE INVENTION

Accordingly, the present invention provides a tool-less method for making molds, cores, and temporary tools. The tool-less method includes the steps of providing a volumetric build system and making a CAD model of a three-dimensional object. The tool-less method also includes the steps of selecting a build material comprising an untreated sand, selecting a binder comprising a polymeric carbohydrate, and applying, by the volumetric build system, the binder onto the build material to volumetrically build the object, wherein the object is adapted for being a casting mold, a casting core, or a temporary tool.

The present invention also provides a tool-less method including the steps of obtaining a representation of an object, selecting a build material comprising an untreated sand, selecting a binder comprising a polymeric carbohydrate, and using the representation of the object, the build material, and the binder to volumetrically build the object, wherein the object is adapted for being a casting mold, a casting core, or a temporary tool.

One advantage of the present invention is that a new tool-less method for making molds, cores, and temporary tooling is provided. Another advantage of the present invention is that the method produces sand molds that are reclaimable by water washing and, therefore, generate minimal dust. Yet another advantage of the present invention is that the method is much faster and lower cost than traditional sand mold making. Still another advantage of the present invention is that the method produces minimal dust, has minimal outgassing, and is environmentally friendly. A further advantage of the present invention is that the method uses untreated sand that is recyclable for multiple reuse. A still further advantage of the present invention is that a volumetric build process is used to make molds, cores, and temporary tooling for producing shapes that are cast in polymers, ceramics, and powdered metals.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
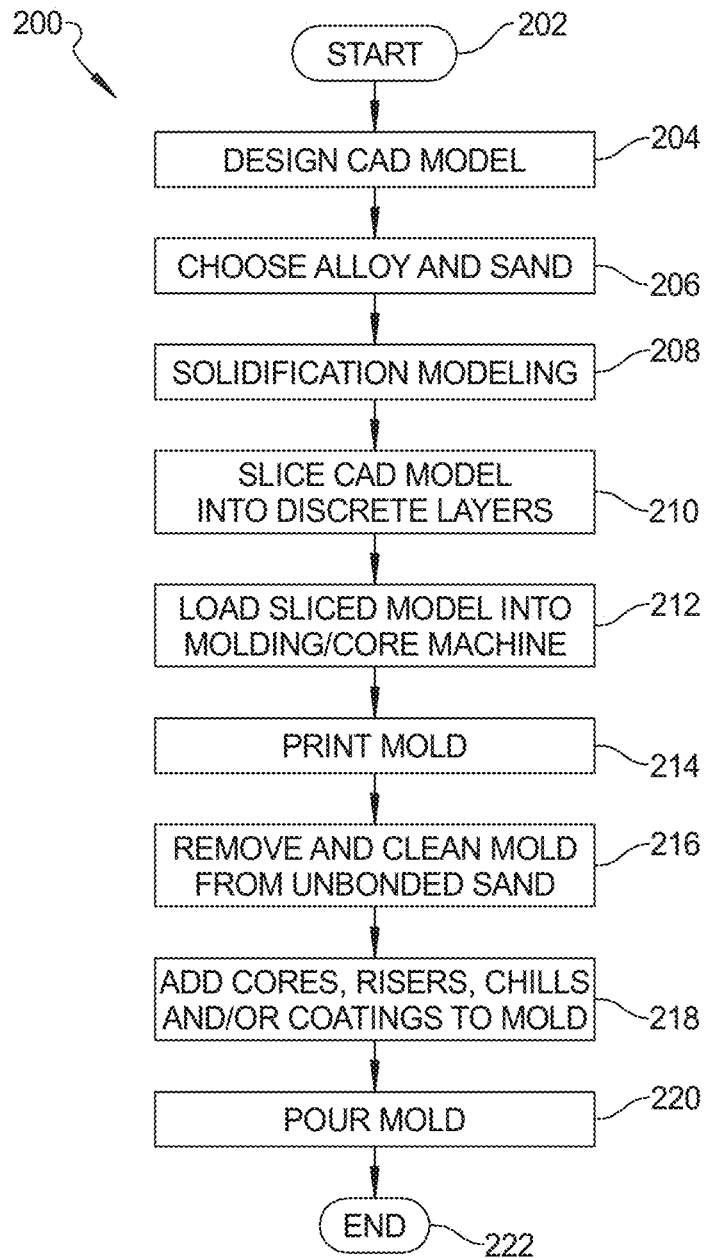
FIG. 1 flowchart of a tool-less method, according to one embodiment of the present invention, for making molds, cores, and temporary tools.

One embodiment of the present invention provides a VB system for three-dimensional building of objects. In one embodiment, granular or particulate matter such as sand is used as a build material that is joined using a stationary bed including 1 to 6 applicator gangs or print arms. The stationary bed allows the applicator gang and printheads to move along an x-direction to print. The VB system also adds a binder onto the build material to build the object. In another embodiment, the VB system and method use polar coordinates and a rotating, circular, base plate with fixed feeder/applicator heads and applicator gangs, building multiple layers using cartesian coordinates. Each applicator gang may be at a different relative height. The binder applicator heads are commercially available, e.g., from Fuji, Kyocera, and Ricoh and are of an inkjet printhead type, for example, a piezo-electric printhead type or thermal inkjet printhead type. It should also be appreciated that the VB system may allow printing in the x-direction and layering and/or curing in the y-direction to speed up print time. It should also be appreciated that the method provides molds for castings, cores, and temporary tooling for producing shapes that are filled or cast in metal, polymers, ceramics, and powdered metals.

All of these volumetrically filled or cast objects may require thermal curing or sintering. In one embodiment, an infrared lamp is coupled to the applicator gang and the form is cured immediately after binder is applied. It should be appreciated that the applicator gangs may include one or more applicator heads for the binder and one or more Electro Magnetic Radiation sources for heating the sand to provide for dehydration and hardening of the binder. It should also be appreciated that the VB system may include an antistatic bar to keep sand off of nozzles of the applicator heads. It should further be appreciated that the VB system may use any suitable mechanism to strike off or compact the sand during the build process.

The present invention also provides a tool-less method, according to one embodiment, for making molds, cores, and temporary tools using a VB system. In the embodiments of the present invention, the method employs a VB process to make metal-casting molds (including investment casting) and components for metal casting molds, e.g. cores, chills, investment casting molds, and temporary tools. It should be appreciated that applications for the method include not only molds for metal casting, but also molds or temporary shapes cast in ceramics, polymers, or powder metal.

In one embodiment of the method, any conventional casting sand in an untreated condition may be used as a build material. Examples of such casting sands include crystalline silica sand, amorphous fused silica sand, lake sand, bank sand, pit sand, chromite sand, zircon sand, olivine sand, alumina sand, mullite sand, and synthetic sands and combinations thereof. In one embodiment, the build material is a fused silica-based mix of sand. In one embodiment, the fused silica-based mix of sand may include crystalline silica sand, rutile, titanium dioxide, iron oxide, sodium silicate, other metal oxides, and combinations thereof. In another embodiment, the build material is alumina-silica based sand. The build material may have any particle size that is amenable to the VB system. In one embodiment, the average particle size may be in the range of about 10 microns to about 1 millimeter, preferably in the range of about 70 microns to about 700 microns, and more preferably in the range of about 125 microns to about 250 microns. In one embodiment, the grain size range may be from about 60 American Foundry Society (AFS) Grain Fineness Number (GFN) to about 100 AFS GFN. In one embodiment, the layer thickness is about 2-5 grains of build material, i.e., 0.008-0.02 inch. In one embodiment, fine particles of calcium carbonate having a micron size to sub-micron size are added in the mix of sand or in the binder to improve strength of the cured mold material. It should be appreciated that the VB system is able to build with a wider range of grain sizes.

In the embodiments of the present invention, the method employs binders suitable for use in the VB process. Suitable binder compositions include, but are not limited to, a polymer, a carrier, a preservative, and, optionally, a dye. Suitable polymers include polyvinylpryrrolidone (preferably with a K value or equilibrium constant of between about 10 and about 100), sucrose, fructose, high fructose corn syrup, polyvinyl alcohol, and starch nanoparticles. Suitable starch nanoparticles include, but are not limited to, corn starch, rice starch, potato starch, wheat starch, and cassava (tapioca) starch to act as binders. Starch nanoparticles (SNPs) are defined as particles that have at least one dimension smaller than 1000 nm, but, are larger than a single molecule or atom. Suitable carriers include water, 2-butoxyethanol, and iso-propyl alcohol. In one embodiment, various surfactants are added to the binder to control the surface tension of the binder. Suitable surfactants include, but are not limited to, sodium lauryl sulfate, sodium lauryl ether sulfate, sorbitan monolaurate, and sodium dodecyl sulfate. In one embodiment, various corn syrups having different dextrose equivalents (DE) are added to the binder in combination with surfactants to control the viscosity and surface tension of the binder. Suitable preservatives include biocides, fungicides and algicides. The binder includes about 20% to about 80% of the starch nanoparticles. It should be appreciated that the dye is optional and is used to indicate where the binder was applied to the build material to make the shape of the object more apparent. It should also be appreciated that the use of fused silica, starch nanoparticles, pH manipulation of the starch suspensions, and their use in inkjet applications is desired.

The amounts of the above components are chosen to achieve the desired application behavior. Preferably, the relative amount of carrier is in the range of about 40 to about 80 weight percent. The relative amount of binder is chosen to provide the amount of bonding required for the build object. Preferably, the relative amount of the binder is in the range of about 20 to about 60 weight percent. It should be appreciated that the ratio of binder to build material is selected for the given application.

To practice the methods of the present invention, the method includes the steps of selecting a binder and a build material for the VB system and the one or more molds, cores, or temporary tooling to make. In one embodiment, the method includes applying the binder onto the untreated build material without pre-coating the untreated build material with a binder. In another embodiment, the method includes pre-coating the untreated build material with a binder and applying the binder onto the pre-coated build material binder. For example, the untreated build material, such as sand, is precoated separately with a binder such as a starch nanoparticle. In yet another embodiment, the method includes applying water onto the pre-coated build material. For example, the untreated build material such as sand is precoated separately with a binder such as a starch nanoparticle and the water is applied by an inkjet printer onto the sand. It should be appreciated that the method is able to apply water and solutions of water and binder. The binder can vary from 0 to about 50% by weight relative to the build material. The binder is the starch nanoparticle from the sources discussed above. It should be appreciated that this binder can be applied onto the build material, such as sand, that has 0% to about 5% pre-coated binder.

The method includes the step of heating the sand and binder to dehydrate and harden the binder using Electro Magnetic Radiation (EMR). In one embodiment, the EMR is in the far infra-red range. For example, the EMR source may be hand-held or fixed to a printer gang and the EMR is applied to the binder to heat, dehydrate and harden the layer of binder. To harden the binder, the temperature, in one embodiment, is above about 212 degrees Fahrenheit to solidify the build material. In one embodiment, the EMR is in the far infra-red range of about 5 microns to about 30 microns. This far infra-red radiation rapidly heats up a layer a few sand grains thick at the surface exposed to the radiation for fused silica sand mixtures as this radiation is preferentially absorbed by fused silica sand. In one embodiment, the far infra-red EMR is applied to the binder for about 2 seconds to about 20 seconds.

In another embodiment, the EMR is in the mid infra-red range. In one embodiment, the mid infra-red radiation (about 2 microns to about 5 microns) can be used to heat, dehydrate, and harden the binder. This mid infra-red radiation rapidly heats up water in the binder a few layer/sand grains thick at the surface exposed to the radiation.

In yet another embodiment, the EMR is in the near infra-red range. For example, when fused silica sand mixtures are used, the heating, dehydrating and hardening of the binder occurs with far infra-red EMR, optionally, in combination with the near infra-red EMR. The near infra-red EMR is used to keep the printed object warm such as between about 100 degrees F. and about 150 degrees F. The near infra-red EMR may be applied from about two minutes to about five minutes. In one embodiment, near infra-red radiation (about 1 micron to about 3 microns) can be used to heat the water present in the binder and assist in finishing the binder hardening. It should be appreciated that the far infra-red EMR allows selective heating and the near infra-red EMR allows bulk heating of the built object.

In still another embodiment, the EMR is in the microwave range. For example, when fused silica sand mixtures containing rutile, titanium dioxide, iron oxide, crystalline silica sand and sodium silicate are used, microwave EMR may be used to heat, dehydrate and harden the binder. The microwaves have a frequency of about 915 Megahertz, 2.45 Gigahertz, or 5.8 Gigahertz. In one embodiment, microwave radiation (0.915 GHz, 2.45 GHz, or 5.86 GHz) can be used to heat, dehydrate and harden the binder for sand mixtures containing materials with a high Dielectric Constant value such as, but not limited to, crystalline silica sand, sands such as rutile, or mixtures containing titanium dioxide, sodium silicate, or iron oxide. It should be appreciated that the lower frequency microwaves have a greater wavelength for deeper penetration of the build object and the higher frequency microwaves have a smaller wavelength for intense surface heating of the build object. It should also be appreciated that the binder may be heated, dehydrated and hardened using direct contact (conductive) heat, infrared radiation, and microwave radiation. It should further be appreciated that direct contact heat can be applied to a sand layer and rapidly heat, dehydrate and harden the binder.

In one embodiment of the method, a CAD file suitable for the VB system is acquired for each of the objects to be made. If more than one object is to be made at a time, a build file is created in which an arrangement is made of the objects to be built in a build bed. The object is then made layer-by-layer from the untreated build material and the binder. The build material is placed on the build bed and spread with a roller or spreader to a desired thickness. The binder is applied on selective areas of the build material to build a layer of the object. The EMR is then applied to the sand and binder to build a hardened layer. Another layer of build material is then place on the build bed and spread. The binder is applied on selective areas of the build material to build another layer of the object. The EMR is then applied to the sand and binder to build a hardened layer. The method is repeated until the build object is completed. It should be appreciated that a different amount of build material can be used for each layer. It should also be appreciated that the applicator gangs are bidirectional (i.e., back and forth) to apply in both directions, and can have an arc shaped movement similar to a windshield wiper.

Optionally, a binder containing a metal powder may be applied on the surface of the object to cause surface alloying of the molten metal poured into the mold cavity. It should be appreciated that the method can apply a binder containing metal powder at the mold-metal interface to modify the physical properties of the surface of the metal casting made in the mold.

Optionally, a dye may be used in the binder to distinguish the built object from the build material when the build object is completed and removed. Optionally, the amount of binder may be varied near the surface of the built object to provide a smoother finish. Optionally the built object may be post heated after being formed to cause cross-linking of the polymer to make the built object stronger. Optionally, a refractory coating, such as a wash or a release agent, e.g. boron nitride, may be applied to the surface of the built object that is to contact the molten metal during casting. It should be appreciated that, in one embodiment, the method is able to apply multiple binders, e.g., polymeric carbohydrate or sodium silicate in different sequences to give the mold different properties in different areas. It should be appreciated that control may be affected by other units than shown, such as one or more separate units.

In one embodiment, the pH of the binder solutions may be controlled to optimize binder application. The pH control is used to prevent conglomeration of the starch molecules by controlling the pH either above or below the pH of the Iso-Electric Point (IEP) for the particular molecules. To achieve a low pH, an acid can be used, e.g., acetic acid, to achieve a high pH, a base can be used, e.g., sodium hydroxide. It should be appreciated that there are a number of starches that may be used including, but not limited to, corn starch, rice starch, potato starch, wheat starch, and cassava (tapioca) starch, etc.

At the conclusion of the building process, the built object or objects may be heated to drive off the remaining carrier and to heat, dehydrate and harden the binder, thus allowing the built object to be removed from the build bed. The built objects may then be assembled into a mold set and molten metal may be cast into the mold set. It should be appreciated that thermo jet (bubble jet), valve jet, and piezo print heads may be used to apply or dispense binder. It should be appreciated that the thickness of the built object may be varied in selected areas for selective thermal insulation. It should also be appreciated that the VB system may use a suitable mechanism to evacuate water vapor from the build bed.

Once the object is built, the build material may be washed with water and the binder will dissolve and the build material reclaimed and reused. The strength of chemically bonded sand molds is typically in the range of about 75 psi to about 150 psi and for chemically bonded sand cores is about 100 psi to about 200 psi. It should be appreciated that molds made using starch nanoparticles may have strengths from about 75 psi to about 300 psi. It should also be appreciated that the build material near the surface of the object may be burnt and blackened and that heating and oxidation above about 700-900 degrees Fahrenheit is used to get rid of the carbon on the build material for reuse. It should also be appreciated that the method of making the built object, removing the metal casting from the mold, and recovering the sand for reuse does not produce any dust. It should be appreciated that starch nanoparticles are an agricultural product and are renewable, biodegradable, and sustainable. It should further be appreciated that this process could be applied to other designs as well, for example, bigger, smaller, and different shapes.

Referring to FIG. 1, the present invention provides a tool-less method 200, according to one embodiment of the present invention, for making molds, cores, and temporary tools from granular or particulate matter using the VB system. The method 200 starts in bubble 202 and advances to block 204. In block 204, the method 200 includes the step of designing or making a CAD model of a three-dimensional object such as molds, cores, or temporary tools. In one embodiment, a CAD model of the object is made to allow the VB system to build the object. The method 200 advances to block 206 and includes the step of selecting or choosing a metal alloy and/or untreated build material such as untreated sand. The method 200 advances to block 208 and includes the step of performing solidification modeling on the CAD model. The method 200 advances to block 210 and includes the step of slicing the CAD model into discrete layers. The method 200 advances to block 212 and includes the step of loading the sliced model into a molding/core machine. The method 200 advances to block 214 and includes the step of building, by the VB system, the object such as a mold, core, or temporary tooling. The method 200 advances to block 216 and includes the step of removing and cleaning the object such as a mold from the unbonded build material such as sand. The method 200 advances to block 218 and includes the step of adding cores, risers, chills, and/or coatings to the object such as a mold. The method 200 advances to block 220 and includes the step of pouring material such as molten metal into the object such as a mold to make a metal casting. The method 200 advances to block 222 and ends. It should be appreciated that, after the metal casting is cooled and solidified, the metal casting is removed from the mold.

Figure 2:
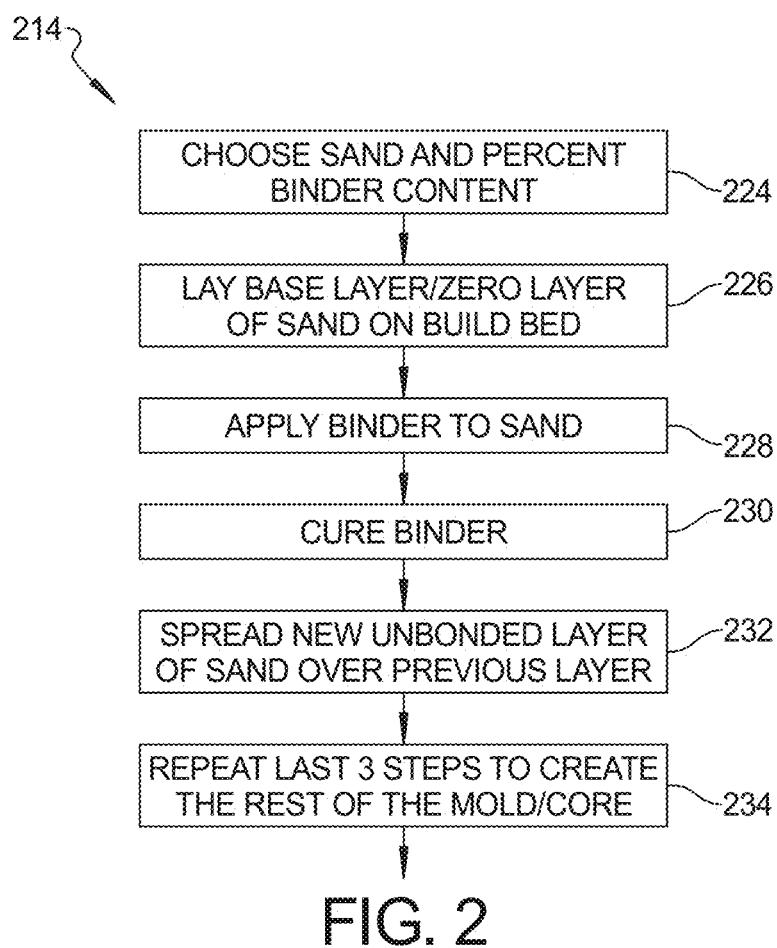
FIG. 2 is a flowchart of a volumetric build step of the tool-less method, according to the present invention, for making molds, cores, and temporary tools of FIG. 1.

Referring to FIG. 2, the step 214 of building, by the VB system, the object such as a mold, core, or temporary tooling of the method 200 of FIG. 1 is shown. For step 214, the method 200 advances from block 212 of FIG. 1 to block 224 of FIG. 2 and includes the step of selecting the build material such as sand and the percent binder content. For example, the user selects the build material and the binder to be used, more specifically, the weight percentage of binder applied to sand. The step 214 advances to block 226 and includes the step of laying or applying a base or zero layer of the build material such as sand on the build bed of the VB system. For example, a user spreads the build material in a layer on the build bed. The step 214 advances to block 228 and includes the step of applying the binder to the build material such as sand. For example, the VB system applies the binder to the building material such as sand. The step 214 advances to block 230 and includes the step of heating, dehydrating and hardening the binder. For example, the Electro Magnetic Radiation source on the applicator arm of the VB system applies EMR to heat, dehydrate and harden the binder. The step 214 advances to block 232 and includes the step of applying a new unbonded layer of build material over the previous layer of hardened build material. The step 214 advances to block 234 and includes the step of repeating the last or previous three steps, 228, 230, and 232 to create the rest of the object that is adapted for being a mold, core, or temporary tooling. The method 200 advances back to step 216 in FIG. 1.

EXAMPLE

A trial of an embodiment of the present invention was conducted using nano-starch binder, having a mold size about 24 inches long, about 12 inches wide, and about 6 inches deep. The build powder was an untreated fused silica sand having an 60-100 mesh or GFN. The binder was about 2.5 weight percent.

Figure 3:
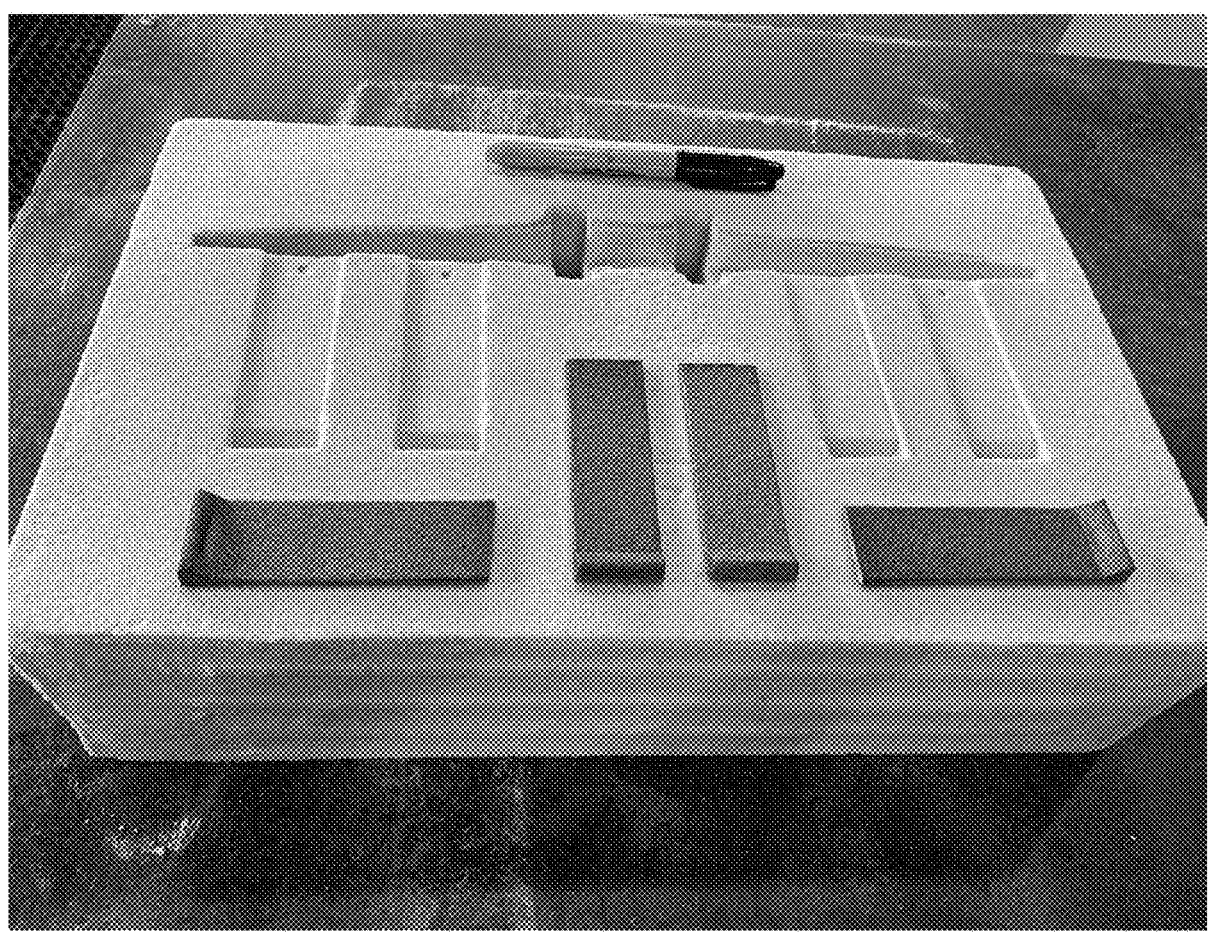
FIG. 3 is a view of a mold made by the tool-less method, according to one embodiment of the present invention.

The part that was selected was a metal-casting mold and is shown in FIG. 3. Molten iron approximately 2500 degree. F. was poured into the mold and allowed to solidify. The iron was approximately 3.5% C and 3% Si. The castings were removed from the mold. FIG. 3 shows the castings separated from the runners and placed on top of a similar sand mold showing the cavities. The castings show good surface finish and dimensional control.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method for producing bonded sand shapes adapted to be used as molds and cores for a metal casting process, said method comprising the steps of:
   providing an additive volumetric build system having a print bed;
   making a CAD model of a three-dimensional object;
   selecting a build material comprising untreated sand;
   selecting a single component binder consisting of starch and an aqueous liquid carrier comprising water in a range of about 40 weight percent to 80 weight percent and forming a binder composition;
   applying the untreated sand in layers repeatedly by the additive volumetric build system by printing in both directions a length of the print bed;
   applying the binder composition to selective areas of the layers of the untreated sand without precoating the untreated sand to form a solid shape of the object;
   heating the applied binder composition with an infrared device or microwave device;
   dehydrating the applied binder composition to form a solid bond between grains of the applied binder composition sand; and
   removing unbonded and untreated sand from around the bonded sand shape.

2. A method as set forth in claim 1 including the step of using at least one inkjet printhead to apply the binder.

3. A method as set forth in claim 2 including the step of using an anti-static bar to keep the sand off of a print head nozzle plate of the printhead.

4. A method as set forth in claim 1 including the step of using electro-magnetic radiation in the infra-red range to heat, dehydrate, and harden the binder.

5. A method as set forth in claim 1 including the step of using electro-magnetic radiation in the microwave range to heat, dehydrate and harden the binder.

6. A method as set forth in claim 1 including the step of evacuating water vapor from the print bed.

7. A method as set forth in claim 1 including the step of striking off/compacting the sand.

8. A method according to claim 1, wherein the binder composition is a solution of the starch dissolved in the water.

9. A method according to claim 1, wherein the infrared device produces infrared light in mid-range infrared wavelengths.

10. A method according to claim 1, wherein the recovered, partially burned, post casting sand is cleaned of residual binder by water washing, thermal treatment, or a combination thereof.

11. A method according to claim 1, wherein the sand contains additives adapted for production of the metal castings.

12. A method according to claim 1, wherein the binder composition is a solution of the starch chosen from at least one of starches derived from corn, potato, rice, wheat, or cassava root.

13. A method according to claim 12, wherein the starch derived from corn is dissolved in the water.

14. A method according to claim 1, wherein the binder composition includes at least one of a surfactant, a biocide, and a colorant.

15. A method according to claim 1, wherein the partially burned, post casting sand is heated to a temperature above 750° F. in order to substantially remove any residual binder.

16. A method according to claim 15, wherein the heated sand becomes thermally reclaimed sand and is used in place of new sand adapted to produce the molds and cores for making the metal castings.

17. A method as set forth in claim 1 including the step of removing the bonded sand shape from the additive volumetric build system and using the bonded sand shape as at least one of molds and cores without post curing to make metal castings.

18. A method as set forth in claim 1 wherein the microwave device produces microwaves with a wavelength between 0.915 GHz and 5.86 GHz.

19. A method for producing bonded sand shapes adapted to be used as molds and cores for a metal casting process comprising the steps of:
    obtaining a representation of a three-dimensional object;
    selecting a build material comprising untreated sand;
    selecting a single component binder consisting of starch and an aqueous liquid carrier comprising water in a range of about 40 weight percent to 80 weight percent and forming a binder composition;
    using the representation of the object, applying the untreated sand in layers, and applying the binder composition to selective areas of the layers of the untreated sand without precoating the untreated sand to form a solid shape of the object;
    heating the applied binder composition with an infrared device or microwave device;
    dehydrating the applied binder composition to form a solid bond between grains of the applied binder composition sand; and
    removing loose, unbonded and untreated sand from around the bonded sand shape.

20. A method as set forth in claim 19 including the step of using a plurality of inkjet printheads to apply the binder.

21. A method as set forth in claim 20 including the step of using an anti-static bar to keep the sand off of a print head nozzle plate of the printheads.

22. A method as set forth in claim 19 including the step of using electro-magnetic radiation in the infra-red range to heat, dehydrate and harden the binder.

23. A method as set forth in claim 19 including the step of using electro-magnetic radiation in the microwave range to heat, dehydrate and harden the binder.

24. A method as set forth in claim 19 including the step of evacuating water vapor from the print bed.

25. A method as set forth in claim 19 including the step of striking off/compacting the sand.

26. A method for producing bonded sand shapes adapted for use as molds and cores for a metal casting process, said method comprising the steps of:
    applying untreated sand to form layers repeatedly made by a CAD driven additive system having a print bed and printing in both directions a length of the print bed;
    applying a single component binder consisting of starch and an aqueous liquid carrier comprising water in a range of about 40 weight percent to 80 weight percent and forming a binder composition to selective areas of each of the layers where the untreated sand is to form a solid shape without precoating the untreated sand;
    passing the binder composition through a plurality of inkjet printheads that cover a width of the print bed width;
    heating the applied binder composition with an infrared device or microwave device;
    dehydrating the applied binder composition to form a solid bond between grains of the applied binder composition sand;
    removing the loose, unbonded and untreated sand from around the bonded sand shape;
    removing the bonded sand shape from the additive system and using the hardened sand shapes as molds, and/or cores, without post curing, to make metal castings.

* * * * *